United States Patent
Hansen

(10) Patent No.: US 8,549,974 B2
(45) Date of Patent: Oct. 8, 2013

(54) APPARATUS FOR CONDITIONING PLASTIC CONTAINERS FOR PUTTING THE SAME INTO USE

(76) Inventor: Bernd Hansen, Sulzbach-Laufen (DE)

( * ) Notice: Subject to any disclaimer, the term of this patent is extended or adjusted under 35 U.S.C. 154(b) by 333 days.

(21) Appl. No.: 12/734,003

(22) PCT Filed: Nov. 4, 2008

(86) PCT No.: PCT/EP2008/009265
§ 371 (c)(1),
(2), (4) Date: Apr. 2, 2010

(87) PCT Pub. No.: WO2009/077039
PCT Pub. Date: Jun. 25, 2009

(65) Prior Publication Data
US 2010/0224048 A1  Sep. 9, 2010

(30) Foreign Application Priority Data
Dec. 14, 2007 (DE) .......................... 10 2007 060 419

(51) Int. Cl.
*B65B 61/06* (2006.01)
(52) U.S. Cl.
USPC .......................................... 83/883; 83/508.3
(58) Field of Classification Search
USPC .......... 83/883, 884, 885, 875, 876, 663, 664, 83/665, 673, 675, 945, 93, 591, 425.2, 83/425.3, 508.3, 437.12; 225/94, 96, 2
See application file for complete search history.

(56) References Cited

U.S. PATENT DOCUMENTS

| | | | | |
|---|---|---|---|---|
| 3,083,746 A * | 4/1963 | Fenton | ............................. | 83/673 |
| 3,897,020 A * | 7/1975 | Knecht | ............................. | 83/665 |
| 4,991,477 A * | 2/1991 | Butt et al. | ......................... | 83/35 |
| 5,127,211 A * | 7/1992 | Mancini | ........................... | 53/467 |
| 5,503,885 A * | 4/1996 | Anderson | ..................... | 428/35.7 |
| 6,308,604 B2 * | 10/2001 | Guzowski | ....................... | 83/257 |
| 7,267,036 B1 * | 9/2007 | Barr et al. | ........................ | 83/102 |
| 2004/0139834 A1 | 7/2004 | Weiler | | |

FOREIGN PATENT DOCUMENTS

| | | |
|---|---|---|
| DE | 199 26 329 A1 | 12/2000 |
| DE | 103 23 335 A1 | 12/2004 |
| WO | WO 99/65777 A1 | 12/1999 |

* cited by examiner

*Primary Examiner* — Stephen Choi
(74) *Attorney, Agent, or Firm* — Roylance, Abrams, Berdo and Goodman

(57) ABSTRACT

An apparatus for conditioning plastic containers for putting them into use, in particular ampoules (13), formed into container blocks (11) side by side next to separating lines (17) at which the containers (13) can be separated from one another for use. A pre-separating station (13) is provided, into which the container blocks (11) can be moved in conveying steps and in which a swinging blade (27) is provided for each of the separating lines (17). The swinging blades (27) are coupled to a common drive (31, 33) for a cutting stroke to produce pre-separating incisions at the separating lines (17) such the cutting strokes of each swinging blade (27) takes place in a sequence offset in time in relation to the cutting strokes of other cutting blades (27).

10 Claims, 4 Drawing Sheets

APPARATUS FOR CONDITIONING PLASTIC CONTAINERS FOR PUTTING THE SAME INTO USE

FIELD OF THE INVENTION

The invention relates to an apparatus for conditioning plastic containers for putting them into use. Specifically containers, in particular ampules, are molded to one another side by side at parting lines to form container blocks. The containers can be separated from one another for use at the parting lines.

BACKGROUND OF THE INVENTION

Processes and apparatus for manufacturing plastic container products are known in the prior art as shown, e.g. by DE 199 26 329 A1. To manufacture such products, a tube of plasticized plastic material, such as polyethylene or polypropylene, is extruded into a molding device. One end of the tube is closed by heat-sealing. The closed end tube is expanded by generating a pneumatic pressure gradient acting on the tube and applied to the molding walls of the molding device, comprising two opposite individual molding halves, to form the container. In carrying out the Bottelpack® process known in this technical field, the respective plastic container is filled within the molding device under sterile conditions by a suitable charging mandrel. After the charging mandrel has been removed, the filled container is hermetically sealed and a specified head geometry is formed. For the purpose of forming the plastic container in which fluid is later stored, two individual mold halves in the form of molding jaws may be moved toward each other by, for example, hydraulic or electric drives to achieve a closing position and away in opposite directions from each other into one of their opening positions. To achieve very high ejection rates of container products, DE 103 23 335 A1 describes a multi-station arrangement, where the various molding steps are divided among different stations arranged one after the other in an imaginary circle to form a carousel arrangement, permitting very high cycle frequencies for the plastic product to be ejected. In such systems, these plastic products emerge along a production line in the form of a container chain in which a plurality of individual containers lie side by side next to one another. Further processing takes place such that in the next phase of the production line, the container blocks or ampule blocks are punched out of the container chain, in particular in the form of an ampule web, with a punching device. In each case, the blocks exhibit a number of individual containers suitable for shipping and use. Frequently, each ampule block comprises five ampules that are connected by parting lines.

The arrangement of containers, for example ampules, in blocks, is practical and advantageous in terms of packaging and shipping. However, in contrast, the use of the individual containers or ampules is less user-friendly. Even if the parting lines inside the blocks are carefully configured with thin walls, the separating process is laborious and even difficult, especially if it involves a relatively stiff synthetic plastic material, as is the case with containers made of polypropylene.

SUMMARY OF THE INVENTION

An object of the invention is to provide an apparatus permitting conditioning containers such that the individual containers or the ampules are easy and convenient to separate for use, while retaining a secure coupling to the parting lines for packaging and shipping purposes.

This object is basically achieved, according to the invention, by an apparatus including a pre-separation station into which the container blocks can be moved in conveying steps and which provides for each of the parting lines of the blocks an oscillating knife. The oscillating knife produces a pre-separation incision at the respective parting line. Depending on the strength properties of the synthetic plastic material of the containers, the length of the pre-separation incision relative to the entire length of the parting lines is chosen such that for packaging and shipping a secure cohesion is maintained owing to the remaining length of the respective parting line. This separating step is easy to carry out without great effort. Owing to the high cycle frequencies conventional in efficiently operating container production systems, the goal is to move as many containers as possible into the pre-separation station in each conveying step. Therefore, this pre-separation station is designed such that a correspondingly large number of oscillating knives are driven for the cutting operation. In light of the relatively rigid plastic material, especially to polypropylene, the resulting necessary high cutting force and the correspondingly high drive power necessary for the common drive of the oscillating knives, the drive unit has to be extremely efficient and be designed with an overly high demand for installation space, if a larger number of oscillating knives are to execute their cutting stroke at the same time. In light of these circumstances, the apparatus according to the invention is configured such that the oscillating knives are coupled to the common drive such that the cutting strokes take place in a sequence offset in time in relation to each other. At a given drive power, the resulting temporal load distribution achieved in this way allows a higher number of oscillating knives to be operated.

In an especially advantageous embodiment, the cutting stroke of the cutting edge of the oscillating knives follows a circular path. The oscillating knives can be arranged to be radially projecting on a common blade shaft connected to a rotary drive. At least one oscillating knife is mounted on the rotary drive offset relative to at least one additional oscillating knife by an angle of rotation for the time offset sequence of the cutting strokes.

For each conveying step, more than one container block can be moved into the pre-separation station. Each block provided with the pre-separation incisions then has a group of oscillating knives. These oscillating knives can be oriented on the blade shaft, preferably such that the pre-separation incisions take place simultaneously at more than one block.

In apparatus designed for high cycle frequencies in which three blocks with five ampules each can be moved into the pre-separation station in each conveying step, the four oscillating knives of each of the groups are advantageously arranged on the blade shaft such that in each case the four oscillating knives that belong to two different groups perform the cutting stroke at the same time. The result is not only an optimal time distribution of the torque load on the drive shaft, but also an advantageous bending moment load on the drive shaft owing to the fact that the cutting force is introduced in the axial direction of the shaft.

In advantageous embodiments, a conveying device can move the container blocks from an input station to the pre-separation station and from pre-separation station into a discharging station used to remove the container blocks provided with pre-separation incisions. The operation of extruding the synthetic plastic material to the working step of packaging by connecting the input station as a continuation of the production line directly downstream from the punching device in which the container blocks are punched out of the container strip can then be automated.

The conveying device has preferably a guide track, along which can be moved a transport slide having a frame for the container blocks being conveyed.

At the same time, the transport slide in the linearly running guide track can be moved to shuttle back and forth between the input station and the pre-separation station.

The pre-separation station can have a lifting device that can lift the container blocks out of the transport slide into a separating position for the pre-separation incisions. The transport slide is then emptied for the return run into the input station and is ready for the next conveying step.

For the blocks provided with the pre-separation incisions, the conveying device can have a conveying track for moving these blocks into the discharging station. From the discharging station, the precut container blocks are unloaded by, for example, an unloading conveyor with a conveying direction extending transversely to the direction of the conveying track.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 4:
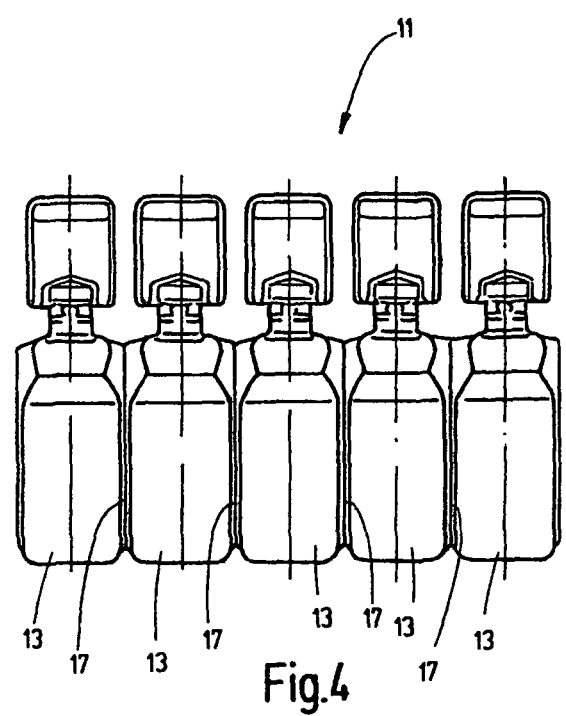
FIG. 4 is a front elevational view of an ampule block, approximately to scale, in the finished state, but prior to a conditioning carried out for putting it into use.

The embodiment of the apparatus according to the invention shown in the drawings has an input station 1, a pre-separation station 3, and a discharging station 5. The input station 1 has the beginning of a conveying device for moving a transport slide 7 along a linear and horizontal guide track 8. This transport slide forms a frame 9 (see FIG. 2) used as a seat holding the three ampule blocks 11 lying side by side and having five ampules 13 each and moves these ampule blocks into the pre-separation station 3 in the direction of the arrow 15 from FIG. 1. FIG. 4 shows, in an individual representation, an ampule block 11 with five individual ampules 13 molded to one another along their abutting side edges at parting lines 17.

The illustrated embodiment of the apparatus constitutes a continuation of a container production line. The apparatus follows a punching device (not illustrated) connected upstream from the input station 1. The ampule blocks 11 are punched out of an ampule web in the same way as it is produced, for example, according to the Bottelpack® system. Coming from the punching device, the blocks 11 are placed, as indicated by the arrow 19 in FIG. 1, into the transport slide 7, located at the beginning of the guide track 8, so that there are three blocks 11, lying side by side, in the frame 9.

Figure 3:
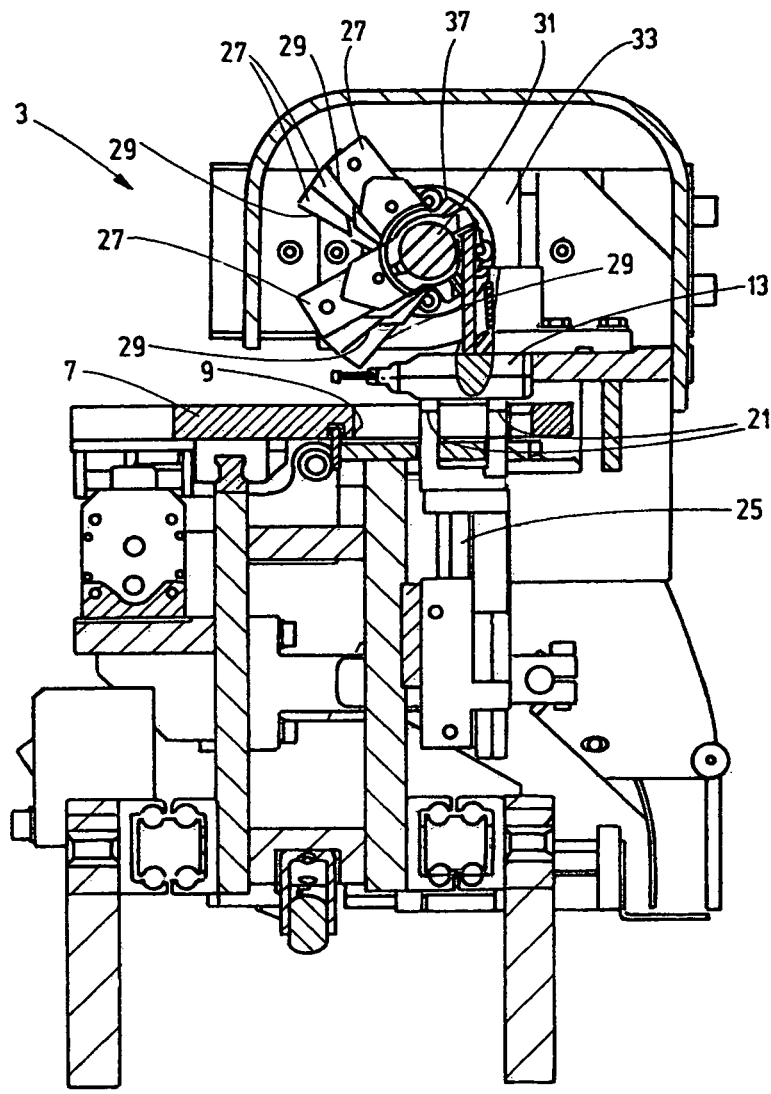
FIG. 3 an enlarged end elevational view in section of the apparatus taken along III-III of FIG. 1.

After the transport slide 7 with the blocks 11 has been moved into the pre-separation station 3, the blocks 11 are lifted out of the frame 9 of the transport slide 7 and brought into their separating position, as shown in FIG. 3, to produce the pre-separation incisions at the parting lines 17. This step is carried out by a lifting device having lifting rails 21 and lying against the underside of the ampules 13 starting from the open end 23 of the slide 7. Openings in the bottom on the slide permit lifting the blocks 11 out of the frame 9. For this lifting the rails 21 can be moved vertically by a lifting cylinder 25. As soon as the blocks 11 are lifted into the separating position and, as a result, the transport slide 7 is emptied, the transport slide is moved back again into the input station 1 from the pre-separation station 3 to receive three more ampule blocks 11 for the next conveying step.

To produce the pre-separation incisions at the blocks 11 located in the separating position, the pre-separation station 3 has a number of oscillation knives 27 matching the number of parting lines 17. In the drawing only some of the oscillating knives 27, depicted in FIG. 3, are marked with 27. Each oscillating knife 27 has a cutting edge 29 (not all of which are numbered) movable on a circular path for the pre-separation incision in that the oscillating knife 27 performs a swiveling motion. For this motion, the oscillating knives 27 are mounted on a common drive shaft 31 rotatable by a drive unit 33. In the illustrated example, this drive unit is a rack and pinion drive. The rack 35 is moved back and forth by hydraulic, pneumatic, or electric means or devices and drives the shaft 31 via a pinion and a freewheeling coupling 37 (FIG. 2).

Figure 1:
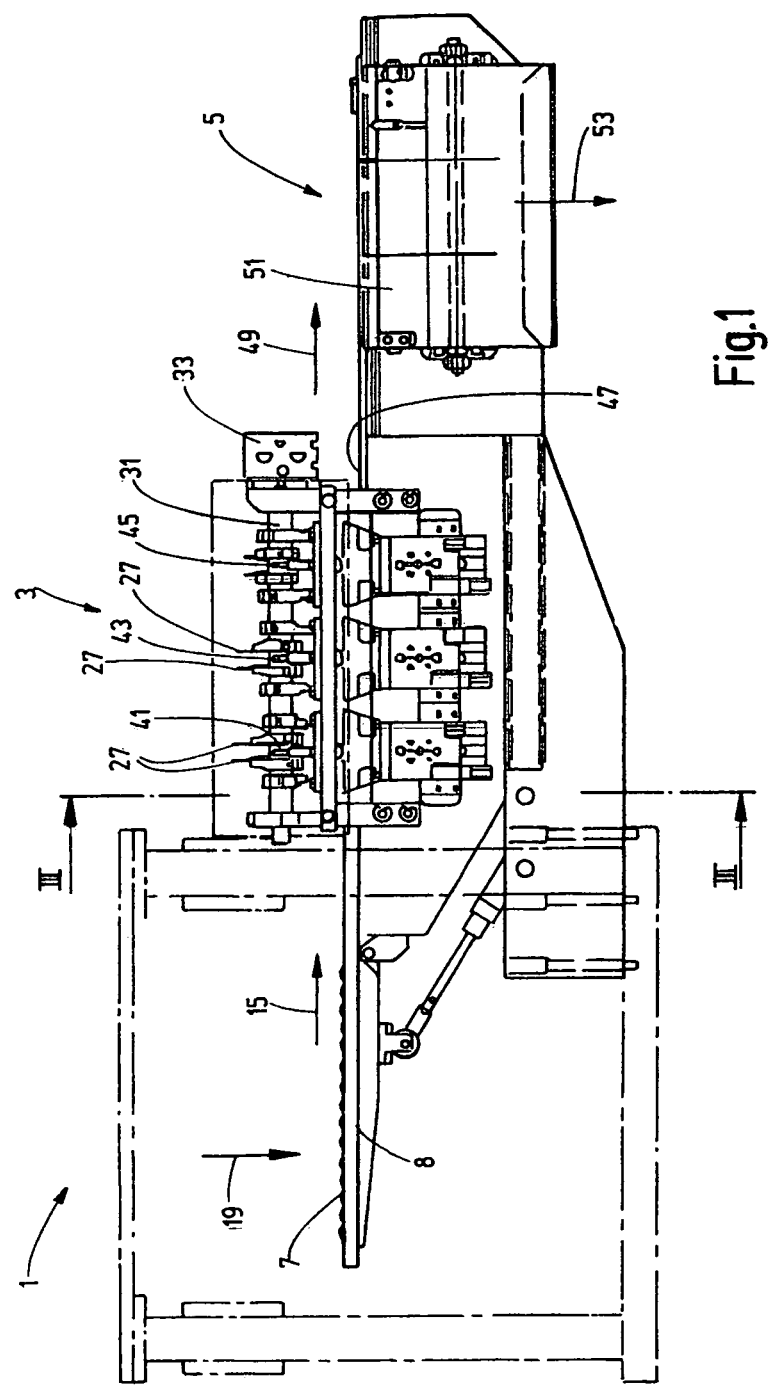
FIG. 1 is a highly simplified, schematic side elevational view of an apparatus according to an exemplary embodiment of the invention.

In the present example where three blocks 11 with five ampules 13 each are brought simultaneously into the separating position in the pre-separation station 3, twelve oscillating knives 27 are mounted on the shaft 31. A simultaneously ensuing pre-separation incision at all of the parting lines 27 would result in a very high demand for driving power for the drive shaft 31, especially if the ampules 13 are made of a synthetic plastic material that is relatively rigid, as, for example, in the case of polypropylene. To remedy this problem, the oscillating knives 27 of this invention are mounted on the drive shaft 31 in a specific arrangement. Specifically, the cutting edges 29 of some of the knives 27 are offset in relation to the cutting edges 29 of the other knives 27 on the shaft 31 by an angle of rotation. In the apparatus according to the invention, the knives 27 are arranged, as a function of the three blocks 11, into three groups of knives 41, 43, and 45 (FIGS. 1 and 2). Each group has four knives 27. The orientation on the shaft 31 is selected such that the cut is produced simultaneously by four cutting edges 29, thus involving the knives 27 of two different groups 41, 43 45 in each case.

Figure 2:
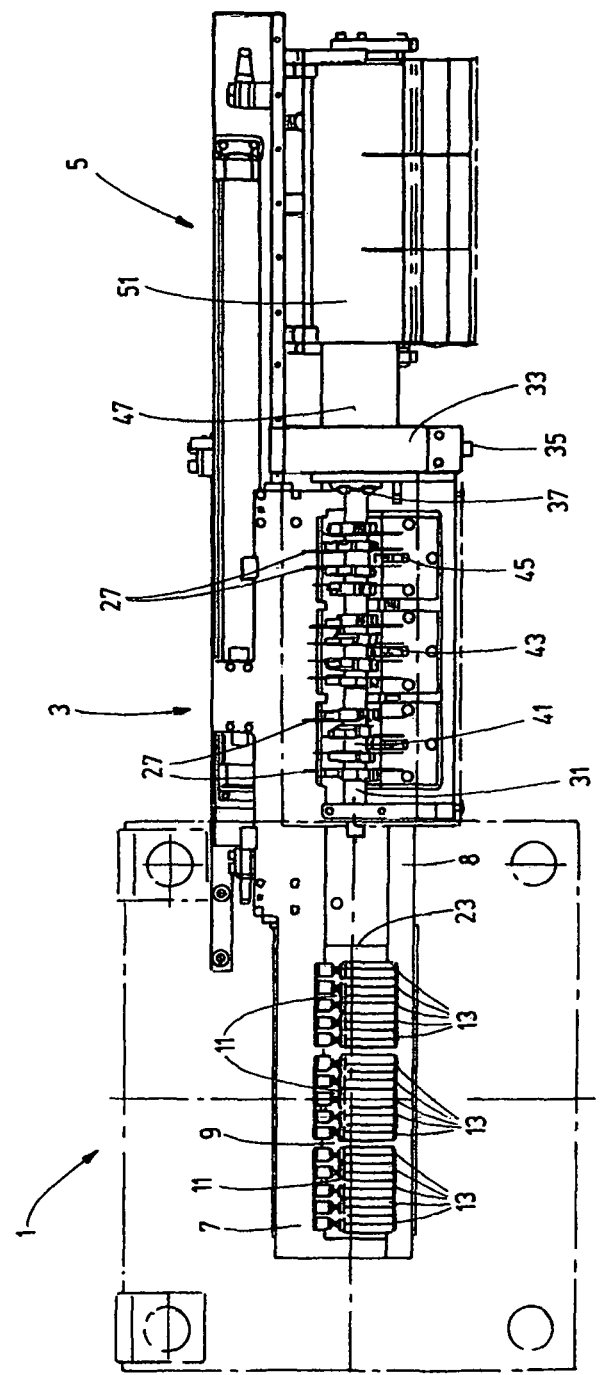
FIG. 2 is a highly simplified, schematic top view of the apparatus in FIG. 1.

A comparison of FIGS. 1 and 2 shows that for this purpose the distribution of the rotational positions can be chosen such that the two center knives 27 of the adjacent groups 41 and 43 have the same orientation, as shown in FIG. 1. FIG. 2 shows a distribution, where the two external knives 27 of group 41 and the two internal knives of group 45 have the same orientation on the shaft 31.

FIG. 3 shows that when the shaft 31 rotates counter-clockwise, the cutting edges 29 are moved on a circular path. The ends of the cutting edges 29 that lie radially the furthest on the outside then move over most of the length of the ampules 13. The radially outermost ends of the cutting edges 29 emerge from the ampule parting line 17 before the entire parting line 17 is severed. In other words, the radial length of the cutting edges 29 relative to the axis of rotation 31 and the position of the ampules 13 in the separating position define the length of the pre-separation incision. That incision is chosen in each case such that the ampules 13 are still adequately connected in the pre-cut blocks 11, a feature that is practical for packaging and shipping, and yet effortless separation of the ampules 13 is possible for putting them into use.

After the transport slide 7 has been emptied by lifting out the blocks 11 and moved back again to the input station 1 and after the lifting device releases the pre-cut blocks 11 by recessing downwards the lifting rails 21, the pre-cut blocks 11 reach a conveying track 47. By the conveying track 47, blocks 11 travel to the discharging station 5 in the direction of the arrow 49 of FIG. 1. For the final unloading of the pre-cut blocks 11 for packaging and shipping, the discharging station 5 has an unloading conveyor 51. Conveyor 51 unloads, as indicated by the arrow 53, the blocks 11 with a conveying direction extending transversely to the direction of the conveying track 47.

While one embodiment has been chosen to illustrate the invention, it will be understood by those skilled in the art that various changes and modifications can be made therein without departing from the scope of the invention as defined in the appended claims.

What is claimed is:

1. An apparatus that conditions plastic containers for use, comprising:
    a pre-separation station with container blocks received therein in conveying steps, the container blocks each having a plurality of containers molded to one another side by side at parting lines;
    one oscillating knife for each parting line of the container blocks in the pre-separation station; and
    a common drive coupled to each oscillating knife for moving each oscillating knife through a cutting stroke producing a pre-separation incision at each parting line, at least one oscillating knife being offset on the common drive relative to another oscillating knife relative to the cutting strokes thereof in an offset time sequence of cutting strokes;
    whereby, the containers in each of the container blocks can be separated from one another by the separation incisions formed in the container blocks at the parting lines.

2. An apparatus according the claim 1 wherein
    the common drive comprises a common drive shaft rotatable by a rotary drive; and
    each oscillating knife projects radially from the common drive shaft and has a cutting edge moveable along a circular path as the common drive shaft rotates, the one oscillating knife being offset by a rotational angle relative to the other oscillating knife for the offset time sequence at cutting strokes.

3. An apparatus according to claim 2 wherein
    the oscillating knives are arranged in groups with one group for each container block of plural container blocks received in the pre-separation station in each conveying step, the oscillating knives being oriented on the common drive shaft such that pre-separation incisions are formed simultaneously in more than one container block.

4. An apparatus according to claim 3 wherein
    the pre-separation station has three container blocks with five ampoules each in each conveying step and has three groups with four oscillating knives in each of the three groups arranged on the common drive shaft such that four oscillating knives of at least two different groups preform cutting strokes simultaneously.

5. An apparatus according to claim 4 wherein
    a conveying device extends between and moves container blocks from an input station to the pre-separation station and extends between and moves container blocks from the pre-separation station and a discharge station that can remove container blocks with pre-separation incisions.

6. An apparatus according to claim 5 wherein
    the conveying device has a guide track and a transport slide moveable on the guide track, the transport slide having a frame receiving the container blocks being conveyed to the pre-separation station.

7. An apparatus according to claim 6 wherein
    the guide track extends linearly; and
    the transport slide is movable to shuttle back and forth between the input station and the pre-separation station.

8. An apparatus according to claim 7 wherein
    the pre-separation station has a lifting device to lift the container blocks out of the transport slide and into a separating position for forming the pre-separation incisions.

9. An apparatus according to claim 8 wherein
    the conveying device has a conveying track moving the containing blocks with the pre-separation incisions into the discharging station.

10. An apparatus according to claim 9 wherein
    the discharging station has an unloading conveyor discharging container blocks in a conveying direction transverse to an extension of the conveying track.

* * * * *